United States Patent
Nakahara

(10) Patent No.: US 10,306,104 B2
(45) Date of Patent: May 28, 2019

(54) IMAGE PROCESSING METHOD AND IMAGE PROCESSING APPARATUS THAT ENSURE EFFICIENT MEMORY USE, AND RECORDING MEDIUM THEREFOR

(71) Applicant: Kyocera Document Solutions Inc., Osaka (JP)

(72) Inventor: Hideo Nakahara, Torrance, CA (US)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 15/798,413

(22) Filed: Oct. 31, 2017

(65) Prior Publication Data
US 2019/0132477 A1    May 2, 2019

(51) Int. Cl.
H04N 1/387    (2006.01)
H04N 1/60    (2006.01)
H04N 1/00    (2006.01)
B41J 2/525    (2006.01)
G06K 15/02    (2006.01)

(52) U.S. Cl.
CPC .......... H04N 1/3873 (2013.01); B41J 2/525 (2013.01); G06K 15/1836 (2013.01); H04N 1/0009 (2013.01); H04N 1/00222 (2013.01); H04N 1/6008 (2013.01)

(58) Field of Classification Search
CPC .............. H04N 1/3873; H04N 1/0009; H04N 1/00222; H04N 1/6008; B41J 2/525; G06K 15/1836
See application file for complete search history.

(56) References Cited

U.S. PATENT DOCUMENTS

| | | | |
|---|---|---|---|
| 9,635,215 B2* | 4/2017 | Kang | H04N 1/2307 |
| 2009/0310149 A1 | 12/2009 | Kawasaki | |
| 2010/0067790 A1* | 3/2010 | Yamamoto | H04N 1/642 382/166 |
| 2012/0014597 A1* | 1/2012 | Matsunaga | H04N 1/644 382/166 |
| 2012/0050763 A1* | 3/2012 | Takeishi | H04N 1/642 358/1.9 |

FOREIGN PATENT DOCUMENTS

JP    2010-074300 A    4/2010
JP    2010-220075 A    9/2010

* cited by examiner

Primary Examiner — Kent Yip
(74) Attorney, Agent, or Firm — HEA Law PLLC

(57) ABSTRACT

An image data processing method includes: allocating a storage region for at least one of a plurality of planes including a first color plane, a second color plane, and a third color plane configured for respective colors of three primary colors; dividing into a plurality of image regions having identical regions that mutually correspond between the plurality of planes; analyzing a variable indicating an identicalness of images in the image regions that correspond between the plurality of planes to determine the identicalness; and executing a sharing process between the plurality of planes based on the determined identicalness so as to generate image data representing an image constituted of the plurality of planes.

15 Claims, 6 Drawing Sheets

Comparative Example

Plane of R (Black)

Plane of G (Black)

Plane of B (Black)

Identical Image Flag

Plane of R (Black Letter)

Plane of G (R Letter)

Plane of G (Black Letter A + Magenta Letter B)

IMAGE PROCESSING METHOD AND IMAGE PROCESSING APPARATUS THAT ENSURE EFFICIENT MEMORY USE, AND RECORDING MEDIUM THEREFOR

BACKGROUND

Unless otherwise indicated herein, the description in this section is not prior art to the claims in this application and is not admitted to be prior art by inclusion in this section.

An image forming apparatus (for example, a printer, a multifunction printer, or a multi-functional peripheral (MFP)) can generally perform a printing process based on a print job that is described in a page description language (PDL). The printing process includes a rasterizing process that extracts an object, such as a text (letter), an image, and vector graphics, from PDL data included in the print job, so as to generate raster data. The rasterizing process generally uses a large memory region as a work area since the rasterizing process converts the object into bitmap image data. Especially, in a color image process, for example, the bitmap image data is generated for each color of RGB and CMYK.

SUMMARY

An image data processing method according to one aspect of the disclosure includes: allocating a storage region for at least one of a plurality of planes including a first color plane, a second color plane, and a third color plane configured for respective colors of three primary colors; dividing into a plurality of image regions having identical regions that mutually correspond between the plurality of planes; analyzing a variable indicating an identicalness of images in the image regions that correspond between the plurality of planes to determine the identicalness; and executing a sharing process between the plurality of planes based on the determined identicalness so as to generate image data representing an image constituted of the plurality of planes.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
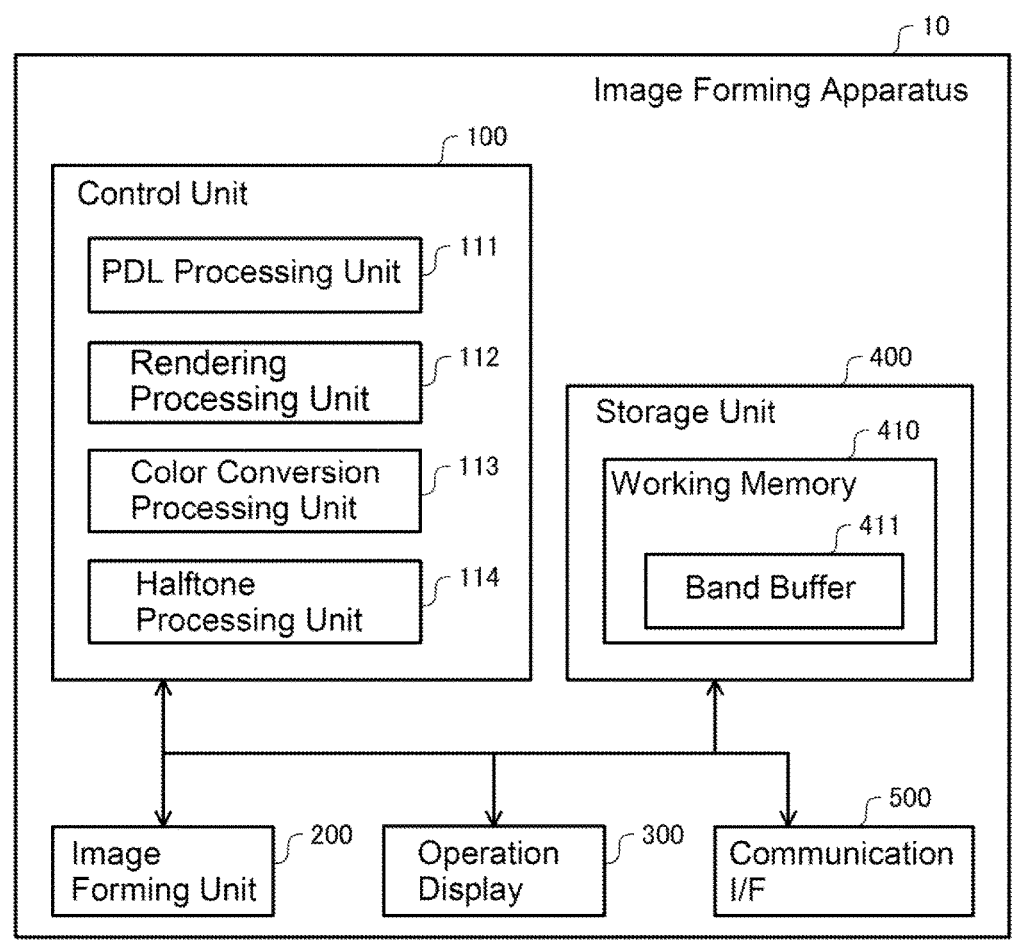
FIG. 1 is a block diagram illustrating a functional configuration of an image forming apparatus 10 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. Embodiment

The following describes, with reference to the drawings, a configuration (hereinafter referred to as an "embodiment") for executing the disclosure.

FIG. 1 is a block diagram illustrating a functional configuration of an image forming apparatus 10 according to one embodiment of the disclosure. The image forming apparatus 10 includes a control unit 100, an image forming unit 200, an operation display 300, a storage unit 400, and a communication interface unit 500. The operation display 300 serves as a touch panel. The operation display 300 displays various menus as an entry screen to accept an operation input from a user. The communication interface unit 500 communicates using, for example, transmission control protocol/Internet protocol (TCP/IP) protocol group.

The image forming apparatus 10 is configured to receive a print job including PDL data described in a page description language (PDL) via the communication interface unit 500. The page description language includes, for example, PCL XL, PostScript, PCL, RPCS, portable document format (PDF), and XPS. The PDL data is also referred to as print data.

The control unit 100 includes a PDL processing unit 111, a rendering processing unit 112, a color conversion processing unit 113, and a halftone processing unit 114. The PDL processing unit 111 analyzes the PDL data to extract an object, such as a text (letter), an image, and vector graphics included in the PDL data. The rendering processing unit 112 uses each of the objects to generate image data of RGB based on rendering information included in the PDL data. RGB are three primary colors in the additive color mixture. RGB are respective examples of a first color, a second color, and a third color.

The storage unit 400 is a storage device constituted of, for example, a hard disk drive and a flash memory, which are non-transitory recording media. The storage unit 400 stores various kinds of data including a control program of a process executed by a processor of the control unit 100. The control program includes a program instruction that is stored in a working memory 410 and executed. In the working memory 410, a memory region (also referred to as a storage region) that is used as a band buffer 411 corresponding to the content of the PDL data is allocated.

Figure 2A:
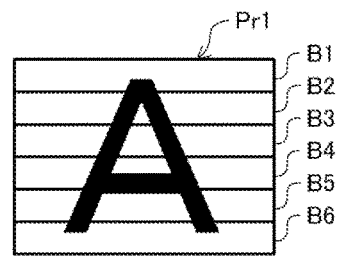
FIGS. 2A to 2D are explanatory drawings illustrating bitmap image data of RGB according to a comparative example.
Figure 2B:
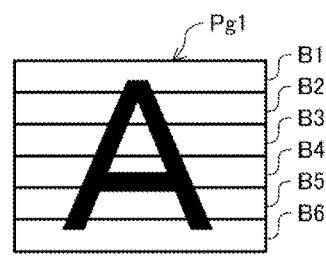
Figure 2C:
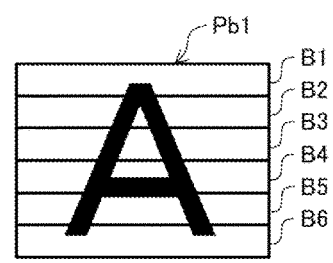

FIGS. 2A to 2D are explanatory drawings illustrating bitmap image data of RGB according to a comparative example. The bitmap image data is constituted as a collection of pixel data that constitutes each of planes Pr1, Pg1, and Pb1 of RGB. FIG. 2A illustrates an R plane for representing a black letter "A" as an object of a rendering target. FIG. 2B illustrates a G plane for representing the black letter "A." FIG. 2C illustrates a B plane for representing the black letter "A." The R plane is a plane that is constituted of a plurality of pixels having tone values of the color R. The G plane is a plane that is constituted of a plurality of pixels having tone values of the color G. The B plane is a plane that is constituted of a plurality of pixels having tone values of the color B.

In this embodiment, each of the planes of RGB is constituted of six bands B1 to B6 that are divided to be a plurality of image regions that are preliminarily set. The band B1 is a band at the uppermost portion in each of the planes. The band B2 is a second band from the top in each of the planes. The bands B3 to B5 are third to fifth bands from the top in each of the planes. The band B6 is a band at the lowest portion in each of the planes. The six bands B1 to B6 are constituted of identical image regions that correspond mutually between each of the planes of RGB. The plurality of image regions are not limited to the bands, but any shape is usable as long as the image regions are common in each of the plane of RGB.

The band B1 represents the upper end portion of the black letter "A." In the band B1, pixel values of pixels that constitute the region of the black letter "A" portion are 0, and pixel values of pixels that constitute the other region, which is the white colored portion, are 255. Similar to the band B1, in the bands B2 to B6, pixel values of pixels that constitute the regions of the black letter "A" portions are 0, and pixel values of pixels that constitute the other regions, which are the white portions, are 255.

Figure 2D:
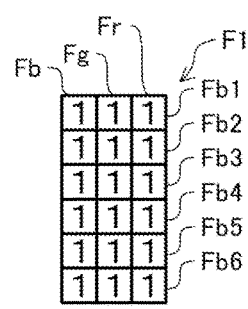

FIG. 2D illustrates an identical image flag F1. The identical image flag F1 indicates identicalness of the images of the image regions (in this example, each of the bands B1 to B6) that correspond mutually between each of the planes of RGB. The identical image flag F1 is constituted of a first band flag Fb1, a second band flag Fb2, a third band flag Fb3, a fourth band flag Fb4, a fifth band flag Fb5, and a sixth band flag Fb6. The first to the sixth band flags Fb1 to Fb6 are constituted of respective first bit Fr, second bit Fg, and third bit Fb. In this description, the identicalness of the images eliminates difference of hues. The identicalness of the images corresponds to, for example, identicalness of print densities of the images.

The first bit Fr, the second bit Fg, and the third bit Fb each include any of flags "0" or "1." The first bit Fr indicates identicalness of an image of the R plane. The second bit Fg indicates identicalness of an image of the G plane. The third bit Fb indicates identicalness of an image of the B plane.

The flag "1" indicates that at least one identical image exists in an identical band of another plane among RGB. The flag "0" indicates that no identical image exists in an identical band of another plane among RGB. In the example of FIG. 2D, it is indicated that all the bands that correspond between all the planes of RGB have identical images.

Figure 3A:
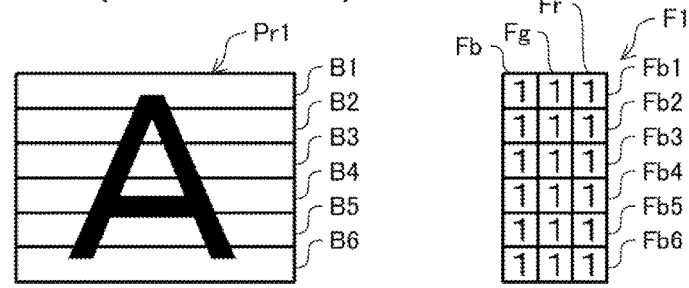
FIGS. 3A to 3C are explanatory drawings illustrating bitmap image data of RGB according to the one embodiment.
Figure 3B:
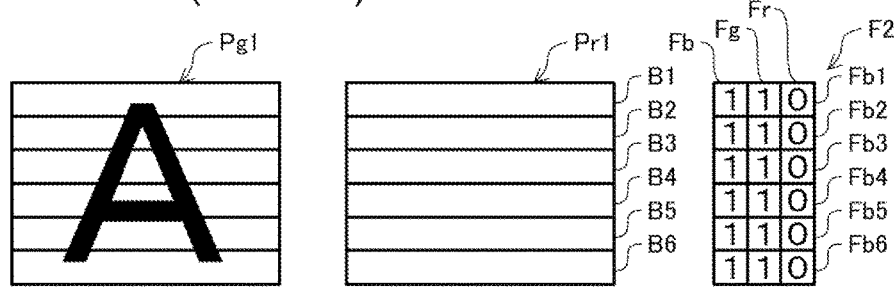
Figure 3C:
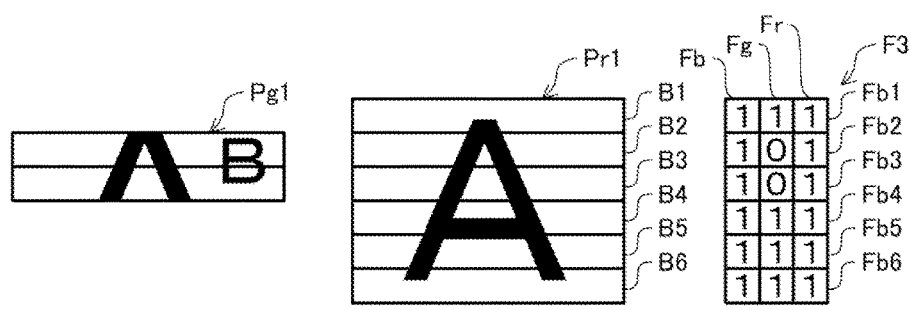

FIGS. 3A to 3C are explanatory drawings illustrating bitmap image data of RGB according to the one embodiment. FIG. 3A illustrates the bitmap image data that represents the black letter "A" as an object of a rendering target. This bitmap image data is constituted of the R plane and the identical image flag F1. The R plane constitutes an image for representing the black letter "A."

Specifically, in the R plane, the pixels in a region constituting the black letter "A" have the lowest tone values of 0 and the other white colored region has the highest tone values of 255. The identical image flag F1 indicates that both the G plane and the B plane have tone values identical to that of the R plane in the six bands B1 to B6. This is because the color of black is constituted as (R, G, B)=(0, 0, 0), that is, an equal color mixture of the lowest tone value 0 of the R plane, the lowest tone value 0 of the G plane, and the lowest tone value 0 of the B plane.

Thus, while in the comparative example, the black letter "A" is represented using data of three planes of RGB representing the identical images, in the embodiment, the black letter "A" can be represented using the data of the one plane of R and the identical image flag F1, which is small in data size. With this, the one embodiment ensures image processing of RGB by allocating a memory region having a memory size substantially for one plane in the band buffer 411.

FIG. 3B illustrates bitmap image data representing an R letter "A" (a letter "A" in the color R) as an object of a rendering target. This bitmap image data is constituted of two planes of R and G and an identical image flag F2. This is because the color R is constituted as (R, G, B)=(255, 0, 0), that is, a color mixture of the highest tone value 255 of the R plane and an equal color mixture of the lowest tone values 0 of the G and the B planes.

Specifically, the R plane constitutes an image for representing the R letter "A." That is, all the pixels have the tone values of the highest tone values 255. In the G plane, the pixels in the region constituting a cyan letter "A" have the lowest tone values 0 and the other white colored region has the highest tone values 255. The identical image flag F1 indicates that the B plane has the tone values identical to the G plane in the six bands B1 to B6.

Specifically, the first bit Fr indicating the identicalness of the image of the R plane has 0 in each of the six bands B1 to B6. That is, the first bit Fr indicates that the image of the R plane does not correspond to any of the images of the G plane and the B plane in the six bands B1 to B6.

The second bit Fg indicating the identicalness of the image of the G plane has 1 in each of the six bands B1 to B6. That is, the second bit Fg indicates that the image of the G plane corresponds to at least any one of the images of the R plane and the B plane in the six bands B1 to B6. Meanwhile, the third bit Fb indicating the identicalness of the image of the B plane has 1 in each of the six bands B1 to B6. That is, the third bit Fb indicates that the image of the B plane corresponds to at least any one of the images of the R plane and the G plane in the six bands B1 to B6.

Thus, the first bit Fr, the second bit Fg, and the third bit Fb each show the following relationship:
(1) the image of the R plane does not correspond to any of the images of the G plane and the B plane (the first bit Fr);
(2) the image of the G plane corresponds to at least one of the images of the R plane and the B plane (the second bit Fg); and
(3) the image of the B plane corresponds to at least one of the images of the R plane and the G plane (the third bit Fb).

This indicates that, in the first bit Fr, the second bit Fg, and the third bit Fb, the image of the R plane does not correspond to the other planes and the images of the G plane and the B plane mutually correspond. With this, the embodiment ensures the image processing by allocating the memory region having a memory size substantially for two planes in the band buffer 411.

FIG. 3C illustrates bitmap image data for representing two objects, the black letter "A" and a magenta letter "B" (a letter "B" in the color magenta). This bitmap image data is constituted of two planes of R and G and an identical image flag F3.

Specifically, in the R plane, the pixels in the region constituting the black letter "A" have the lowest tone values of 0, and the other white colored region has the highest tone values of 255. The G plane is constituted only of two bands, the band B2 and the band B3. The pixels in the region constituting the black letter "A" and the magenta letter "B" have the lowest tone values of 0, and the other white colored region includes the highest tone values of 255. The identical image flag F3 indicates that the respective planes of RGB have mutually identical tone values in the band B1, the band B4, the band B5, and the band B6, and both the planes of RB have mutually identical tone values in the band B2 and the band B3.

This indicates that, in the first bit Fr, the second bit Fg, and the third bit Fb, the images of the R and the B planes mutually correspond in the six bands B1 to B6 and the images of all the planes of RGB mutually correspond in the four bands B1, B4 to B6. With this, the embodiment ensures the image processing by allocating the memory region having a memory size for one plane and the memory region having a memory size for two bands in the band buffer 411.

Thus, the image forming apparatus 10 according to the one embodiment ensures the image processing simply by allocating the memory region having a small memory size in the band buffer 411 when the object of the rendering target is single color vector graphics or similar graphics in each of the bands. The image forming apparatus 10 is configured to analyze a content of the single color object of the rendering target in each of the six bands B1 to B6, specify the memory size of the memory region required for the image processing based on the analysis result, and generate the identical image flags F1 to F3.

Figure 4:
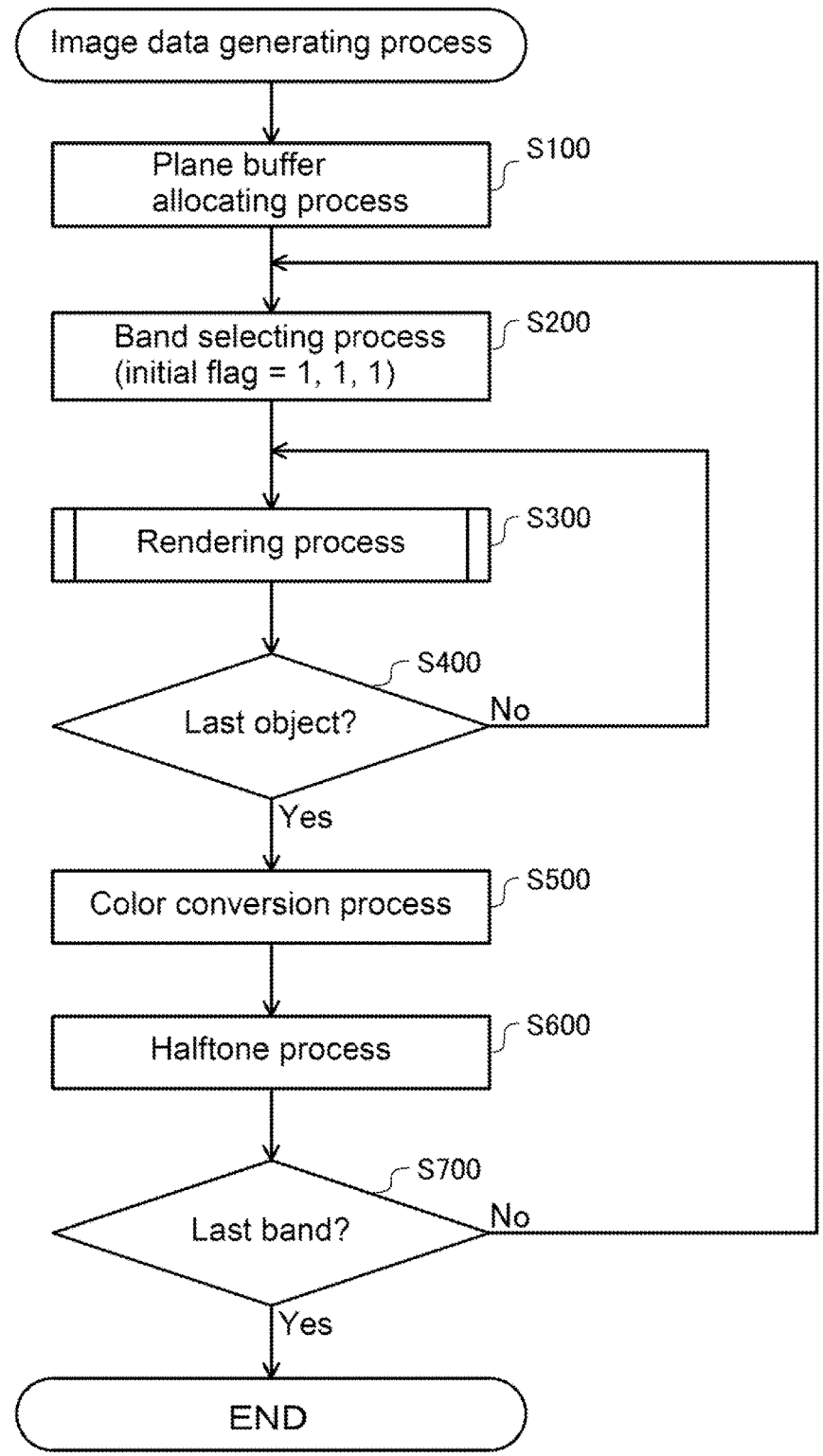
FIG. 4 is a flowchart illustrating a content of an image data creation process according to the one embodiment.

FIG. 4 is a flowchart illustrating a content of an image data creation process according to the one embodiment. At Step S100, the rendering processing unit 112 of the control unit 100 executes a plane buffer allocating process. In the plane buffer allocating process, the rendering processing unit 112 specifies the memory size of the memory region required for the image processing of a single plane (in this example, the R plane) based on, for example, the single color object of the rendering target in each of the six bands B1 to B6. The rendering processing unit 112 allocates the band buffer 411 having a specified size and sets an initial value 255 (white) as an initial value of the tone value of the respective colors.

At Step S200, the rendering processing unit 112 executes a band selecting process. In the band selecting process, the rendering processing unit 112 sequentially selects the six bands B1 to B6. In this example, the first band B1 is selected. An initial flag=1, 1, 1 is set into the selected first band B1.

Figure 5:
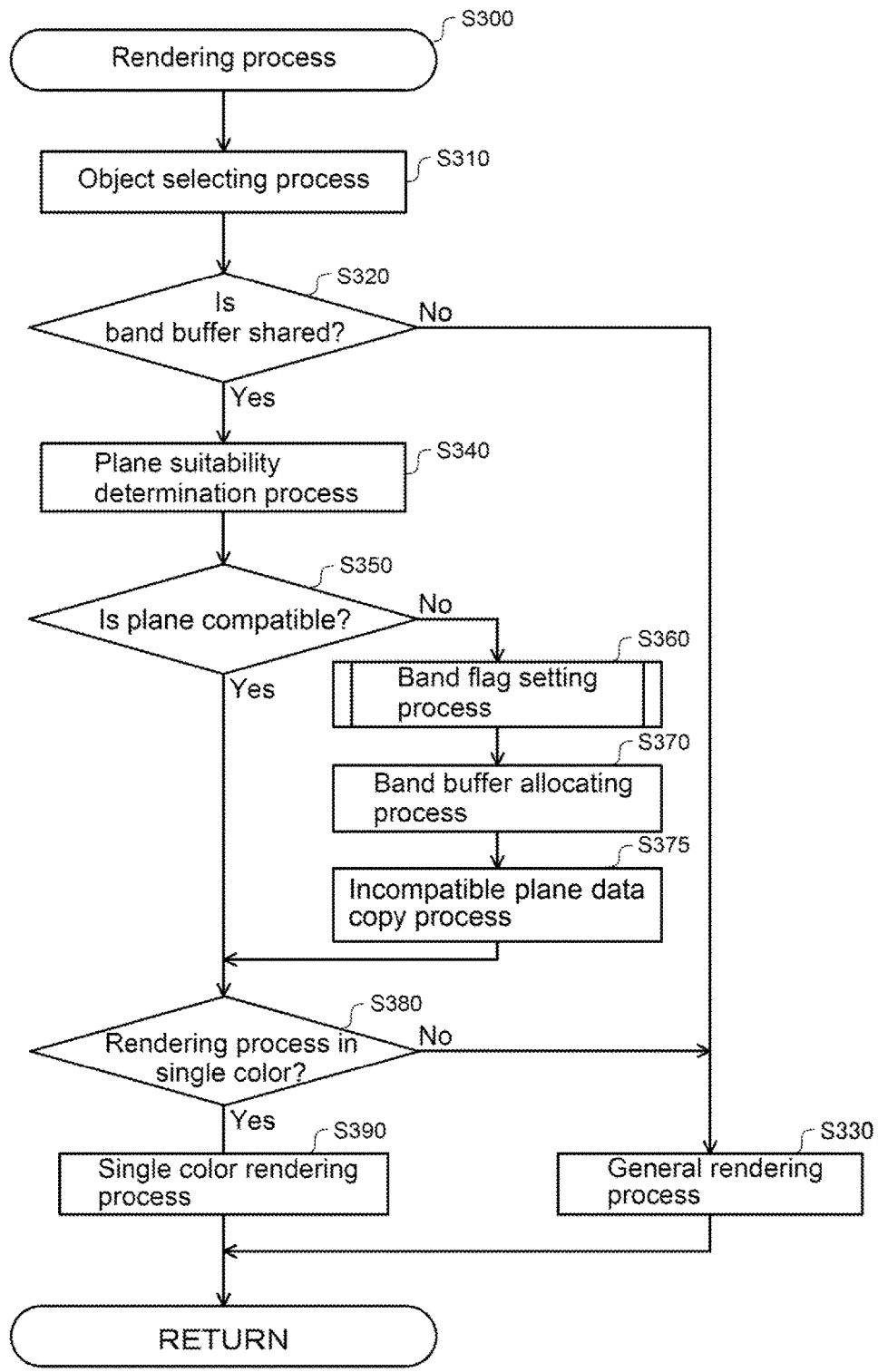
FIG. 5 is a flowchart illustrating a content of a rendering process according to the one embodiment.

FIG. 5 is a flowchart illustrating a content of a rendering process according to the one embodiment. At Step S300, the rendering processing unit 112 executes the rendering process. At Step S310, the rendering processing unit 112 executes an object selecting process. In the object selecting process, the PDL processing unit 111 analyzes the PDL data included in the print job to specify the single color object (for example, the image (the black letter "A") illustrated in FIG. 2 and FIG. 3A) of the rendering target in the band B1. The rendering processing unit 112 sequentially selects an object used for rendering the band B1 from the specified object.

At Step S320, when the band B1 is shared, the rendering processing unit 112 advances the process to Step S340. When the band B1 is not shared, the rendering processing unit 112 advances the process to Step S330. At Step S330, the rendering processing unit 112 executes the image processing of each of the planes of RGB as a general rendering process. In an initial state where the band is selected, assume that all the planes of RGB are shared.

At Step S340, the rendering processing unit 112 executes a plane compatibility determination process. In the plane compatibility determination process, the rendering processing unit 112 determines whether the respective planes sharing the band buffer have compatibility to sharing or not. The compatibility is determined based on the analysis result of the object.

At Step S350, when the plane is compatible to sharing, the rendering processing unit 112 advances the process to Step S380. When the plane is not compatible to sharing, the rendering processing unit 112 advances the process to Step S360. In this example, the rendering processing unit 112 selects, for example, the black letter "A" as the object and executes its rendering process (FIG. 3A and FIG. 3C).

Since all the planes are compatible to sharing, the rendering processing unit 112 advances the process to Step S380 without executing the processes of Steps S360 and S370. Thus, while the band flag has the initial flag=1, 1, 1, only the R plane is generated. This means that simply completing the rendering process of the R plane by the rendering processing unit 112 completes the rendering process of all the planes of RGB.

As another example, the rendering processing unit 112 selects, for example, the R letter "A" as the object and executes its rendering process (FIG. 3B). In this case, the rendering processing unit 112 advances the process to Step S360 (Step S350). At Step S360, the rendering processing unit 112 executes a band flag setting process.

Figure 6:
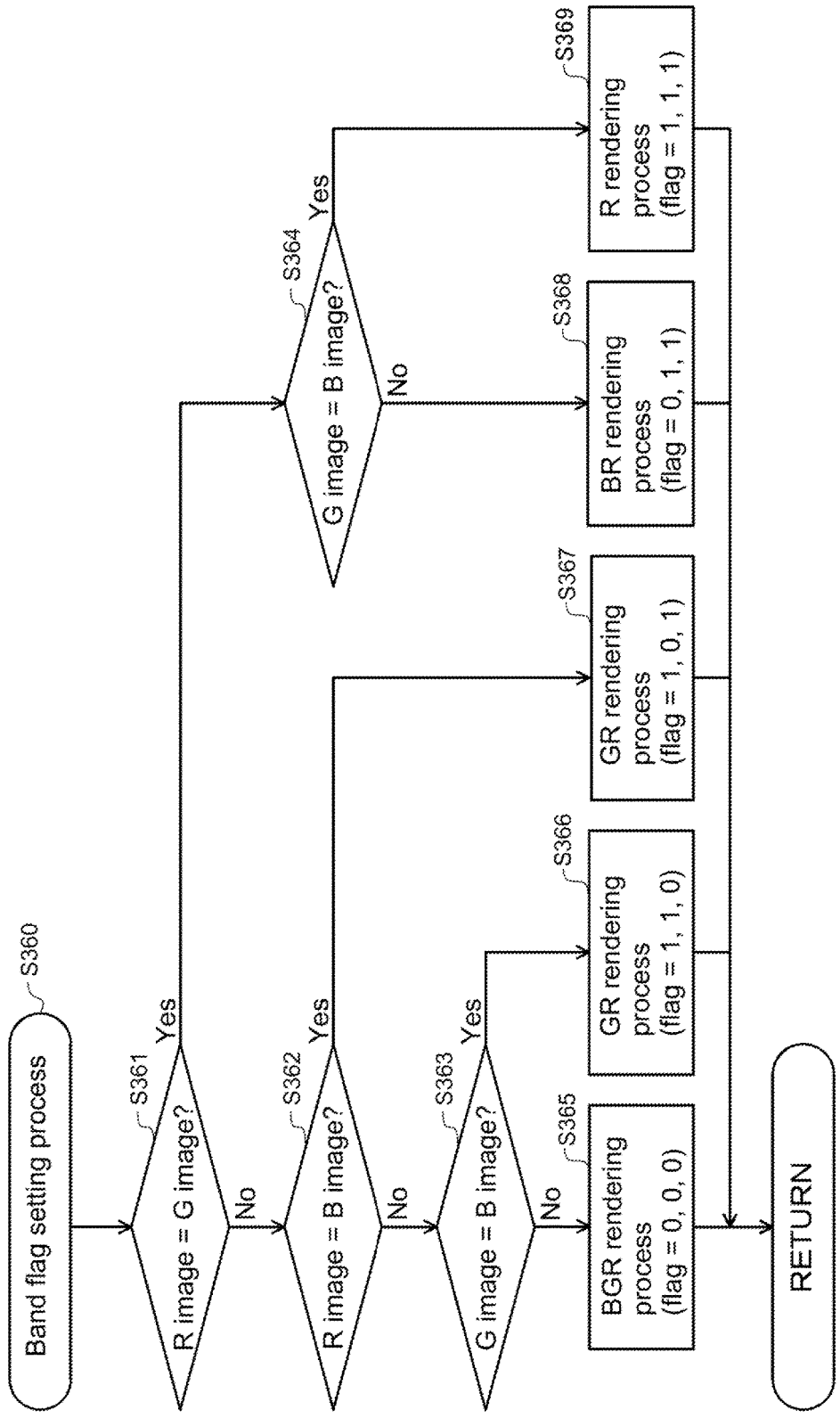
FIG. 6 is a flowchart illustrating a content of a band flag setting process according to the one embodiment.

FIG. 6 is a flowchart illustrating a content of the band flag setting process according to the one embodiment. At Step S361, the rendering processing unit 112 determines whether the image of the R plane and the image of the G plane are identical or not. Since the image of the R plane and the image of the G plane are not identical when rendering the R letter "A," the rendering processing unit 112 advances the process to Step S362.

At Step S362, the rendering processing unit 112 determines whether the image of the R plane and the image of the B plane are identical or not. Since the image of the R plane and the image of the B plane are not identical when rendering the R letter "A," the rendering processing unit 112 advances the process to Step S363.

At Step S363, the rendering processing unit 112 determines whether the image of the G plane and the image of the B plane are identical or not. Since the image of the G plane and the image of the B plane are identical when rendering the R letter "A," the rendering processing unit 112 advances the process to Step S366.

At Step S366, when the image of the R plane and the image of the G plane are rendered, the rendering processing unit 112 can determine that the image of the B plane can be shared in the image of the G plane. Thus, the rendering processing unit 112 changes the flag of the first bit Fr from "1" to "0" in the initial flag=1, 1, 1 so as to set the band flag=1, 1, 0.

At Step S370, the rendering processing unit 112 allocates a memory region for G plane in the band buffer 411. At Step S375, the rendering processing unit 112 copies the processed R plane data as the G plane data into the memory region for G plane allocated in the band buffer 411. This allows the rendering processing unit 112 to continue the rendering process effectively using the processed R plane data.

At Step S380, in the case of a single-color rendering process, the rendering processing unit 112 advances the process to Step S390. In the case of not being the single-color rendering process, the rendering processing unit 112 advances the process to Step S330. In this example, since the object is the black letter "A" or the R letter "A," the rendering processing unit 112 executes the single-color rendering process (Step S390).

As illustrated in FIG. 4, the rendering processing unit 112 executes the processes of the rendering process (Step S300) on all the objects (in this example, the black letter "A" or the R letter "A") and advances the process to Step S500 in response to a process completion of the last object (Step S400).

At Step S500, the color conversion processing unit 113 executes a color conversion process. In the color conversion process, the color conversion processing unit 113 converts the colors into colors in a color space of CMYK that are reproducible with the image forming unit 200. In the example of rendering the black letter "A" (FIG. 3A and FIG. 3C), the color conversion processing unit 113 converts the tone values of the pixels (R, G, B)=(0, 0, 0) in the black letter region into the highest tone values of 255 of K (CMY=the lowest tone values 0) and the tone values of the pixels (R, G, B)=(255, 255, 255) in an empty space in a background into the lowest tone values of 0 of K (CMY=the lowest tone values 0) for all the planes of RGB. CMY are three primary colors in the subtractive color mixture. CMY are respective examples of a first color, a second color, and a third color.

In this example, the color conversion processing unit 113 generates image data including image data of a K plane to reproduce the black letter "A." Meanwhile, for CMY, a memory region of a C plane is allocated and used as the initial value of 0. For MY, the C plane is available. The C plane is a plane constituted of a plurality of pixels having tone values of the color C. An M plane is a plane constituted of a plurality of pixels having tone values of the color M. A Y plane is a plane constituted of a plurality of pixels having tone values of the color Y. The K plane is a plane constituted of a plurality of pixels having tone values of black.

Meanwhile, in the example of rendering the R letter "A" (FIG. 3B), the color conversion processing unit 113 converts the tone values of the pixels (R, G, B)=(255, 0, 0) in an R letter region into the highest tone values of 255 of M and Y (C=the lowest tone values 0) and converts the tone values of the pixels (R, G, B)=(255, 255, 255) in the empty space in the background into the lowest tone values of 0 of K (CMY=the lowest tone values 0) for all the planes of RGB (including the sharing).

In this example, the color conversion processing unit 113 generates image data including image data of the plane of M to reproduce the R letter "A" and an identical image flag. The identical image flag is also referred to as a second variable and indicates that the planes of M and Y are identical data that can be mutually shared. Accordingly, for MY, a memory region of the M plane is allocated and used as the highest tone values of 255. For Y, the M plane is available. Meanwhile, the C plane can be used as the initial value of 0 without any change.

The second variable may indicate not only the identicalness of the images between the planes of CMY but also the identicalness of the images between CMY and K. It is because, for example, in a region where the dots are not formed, all of CMYK have the identical value of the initial value of 0 and it is effective for the reduced usage memory.

In the color conversion process, the color conversion is not necessarily performed after actually executing the sharing of a plane, but for example, a method that directly converts based on one plane (for example, the C plane) and a flag that indicates a sharing destination may be employed.

At Step S600, the halftone processing unit 114 executes a halftone process. In the halftone process that reproduces the black letter "A," the halftone processing unit 114 executes a data processing to reproduce a midtone with dots that are reproducible with the image forming unit 200. In this example, the halftone processing unit 114 executes the halftone process targeting image data of the K plane to generate halftone data including a K dot plane.

The K dot plane is constituted of K dot data indicating a forming state of dots formed of a color material of black. Meanwhile, for CMY, a memory region of a C dot plane is allocated and used as the initial value of 0. For MY, the C dot plane can be shared. The C dot plane is a plane constituted of dot data indicating a forming state of dots formed of a color material of the color C. An M dot plane is a plane constituted of dot data indicating a forming state of dots formed of a color material of the color M. A Y dot plane is a plane constituted of dot data indicating a forming state of dots formed of a color material of the color Y. The K dot plane is a plane constituted of dot data indicating a forming state of dots formed of a color material of black.

In the example of reproducing the R letter "A," the halftone processing unit 114 executes the halftone process targeting the image data of the planes of M and Y, and generates halftone data including the M dot plane and an identical image flag. The identical image flag is also referred to as a third variable. The identical image flag indicates that the dot planes of M and Y are identical data that can be mutually shared. Accordingly, for MY, a memory region of the M dot plane is allocated and used as the highest tone values of 255. For the Y dot plane, the M dot plane is available.

At Step S700, the rendering processing unit 112 determines whether the processing target is the last band (in this example, the band B6) or not. In the case of the last band, the rendering processing unit 112 terminates the process. Not in the case of the last band, the rendering processing unit 112 returns the process to Step S200. At Step S200, since the process of the band B1 has been completed, the rendering processing unit 112 selects the band B2 to set the initial flag.

In the band B2, the image forming apparatus 10 according to the one embodiment executes the following process to render the magenta letter "B" in addition to the black letter "A" illustrated in FIG. 3C. In this example, in the band B2, the rendering processing unit 112 generates bitmap image data to represent two objects, the magenta letter "B" (the letter "B" in the color magenta) in addition to the black letter "A," as illustrated in FIG. 3C.

At Step S350 (see FIG. 5), the rendering processing unit 112 advances the process to Step S360 based on the determination of incompatibility of the sharing in the plane compatibility determination process (Step S340). At Step S360, the rendering processing unit 112 executes the band flag setting process (see FIG. 6).

At Step S361, the rendering processing unit 112 determines whether the image of the R plane and the image of the G plane are identical or not. In this example, as illustrated in FIG. 3C, since the image of the R plane and the image of the G plane are not identical when rendering the magenta letter "B," the rendering processing unit 112 advances the process to Step S362.

At Step S362, the rendering processing unit 112 determines whether the image of the R plane and the image of the B plane are identical or not. In this example, as illustrated in FIG. 3C, since the image of the R plane and the image of the B plane are identical when rendering the magenta letter "B," the rendering processing unit 112 advances the process to Step S367.

At Step S367, when the image of the R plane and the image of the B plane are rendered, the rendering processing unit 112 can determine that the image of the B plane can be shared in the image of the R plane. Thus, the rendering processing unit 112 changes the flag of the second bit Fg from "1" to "0" in the initial flag=1, 1, 1 so as to set the band flag=1, 0, 1.

At Step S370, the rendering processing unit 112 allocates a memory region for G plane in the band buffer 411 and copies the processed R plane data into the G plane. This allows the rendering processing unit 112 to continue the rendering process effectively using the processed R plane data.

At Step S380, in the case of the single-color rendering process, the rendering processing unit 112 advances the process to Step S390. Not in the case of the single-color rendering process, the rendering processing unit 112 advances the process to Step S330. At Step S390, the rendering processing unit 112 executes the single-color rendering process.

As illustrated in FIG. 4, the rendering processing unit 112 executes the processes of the rendering process (Step S300) on all the objects (in this example, the black letter "A" and the magenta letter "B") and advances the process to Step S500 in response to a process completion of the last object (Step S400).

At Step S500, the color conversion processing unit 113 executes the color conversion process. In the color conversion process, the color conversion processing unit 113 converts the tone values of the pixels (R, G, B)=(0, 0, 0) in the black letter "A" region into the highest tone values of 255 of K (CMY=the lowest tone values 0), the tone values of the pixels (R, G, B)=(255, 0, 255) in the magenta letter "B" region into the highest tone values of 255 of M (CY=the lowest tone values 0), and the tone values of the pixels in the region including the pixels (R, G, B)=(255, 255, 255) in the magenta letter "B" region and the empty space in the background into the lowest tone values of 0 of K.

In this example, in the band B2, the color conversion processing unit 113 generates image data including image data of the M plane. Meanwhile, for CY, a memory region of the C plane is allocated and used as the initial value of 0. For Y, the C plane is available.

At Step S600, the halftone processing unit 114 executes the halftone process. In this example, the halftone processing unit 114 executes the halftone process targeting the image data of the planes of M and K, and generates halftone data including the dot planes of M and K. Meanwhile, for CY, a memory region of the C dot plane is allocated and used as the initial value of 0. For Y, the C dot plane is available.

Such process (Steps S200 to S600) are sequentially executed up to the band B6, which is the last band (Step S700). In this example (the examples in FIG. 2 and FIG. 3A), the control unit 100 is configured to execute similar process for the band B3 to the band B6 and generate halftone data of CMYK.

Thus, the image forming apparatus 10 according to the one embodiment ensures omitting the process of the identical images generated in each of the planes of, for example, RGB by analyzing the PDL included in the print job. With this, the image forming apparatus 10 ensures an efficient memory use and a reduced processing cost of image processing.

B. Modifications

The disclosure is not limited to the above-described embodiment, but modifications, such as the following, can be employed.

Modification 1

While in the above-described embodiment, the disclosure is applied when an object that is reproduced in a single color of any of RGBCMY at the highest tone values is a rendering target, it is not necessarily limited to the case where the object that is reproduced in a single color of any of RGBCMY at the highest tone values is the rendering target.

Specifically, for example, an index color may be set, and a combination of one or two planes of RGB and a flag may be generated based on this set content. The index color is preliminary set so as to be reproduced in a combination of a plurality of images including at least one pair of identical images (including an empty space image with all the tone values being 0). The index color may be any color as long as it is a color to reproduce a specific image reproduced by an equal color mixture using planes representing at least one pair of the identical images (including the empty space image) that can mutually be shared.

Furthermore, in a color conversion of the index color, for example, a color conversion process that is preliminarily and additionally set to enable a color reproduction of the pure colors and vivid colors of CMY in printing presentation materials may be executed.

Modification 2

While in the above-described embodiment, a part of process of the planes of RGB, the planes of CMYK, and the dot planes of CMYK are omitted, only the process of RGB may be omitted.

Modification 3

While in the above-described embodiment, the identical image flag is constituted of 3 bits, the identical image flag and an identical data flag only need to be constituted as a variable indicating the identicalness of image data and halftone data, and the data format does not matter.

Modification 4

While in the above-described embodiment the number of planes as the shared targets is three, four or more planes where, for example, color materials of light colors (such as light cyan and light magenta) are employed may be shared.

Modification 5

While in the above-described embodiment, the disclosure is applied to the image data processing as a letter rendering process in the image forming apparatus, the disclosure is applicable to an image data processing as a letter rendering process for other image display apparatuses including a display.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In an image forming apparatus for printing or displaying print data described in a page description language (PDL), the image forming apparatus including a control unit having a processor, an image forming unit, and a storage unit having a working memory and storing a control-unit process control program containing instructions in the working memory whose execution by the processor configures the control unit as a PDL processing unit, a rendering processing unit, and a color conversion processing unit, an image data processing method comprising:

analyzing, in the PDL processing unit, the print data to extract objects included in the print data;

generating bitmap-image pixel data in the rendering processing unit using the objects, based on rendering information contained in the print data, the bitmap-image pixel data including respective pluralities of pixels constituting first, second, and third primary-color planes;

executing a plane buffer allocating process in the rendering processing unit of allocating in a band buffer in the working memory a band buffer region having a memory size substantially for at least one of the first, second, and third primary-color planes;

dividing each of the first, second, and third primary-color planes into a plurality of bands constituted by mutually corresponding identical image regions;

generating, in the color conversion processing unit, image-reproduction data in each of the first, second, and third primary-color planes for reproducing the print-data objects, and generating for each of the first, second, and third primary-color planes an identical image flag as a variable indicating identicalness of the bands;

analyzing, in the rendering processing unit, the variables to determine identicalness of the bands;

executing, in the rendering processing unit, a plane compatibility determination process of determining based on the determined identicalness of the bands whether respective planes sharing a band buffer region have compatibility for sharing, so as to generate image rendering data representing an image constituted of the first, second, and third primary-color planes, according to which for any two planes having shared images, color-rendering of an object is carried out for only one plane; and printing or displaying the image rendering data with the image forming unit.

2. The image data processing method according to claim 1, wherein the analyzing includes executing a determination whether an object extracted from the print data instructs a reproduction of a specified image that is reproduced by any one of the three primary colors or an equal color mixture of the three primary colors or not, and generating the variable upon determining that the object instructs the reproduction of the specified image.

3. The image data processing method according to claim 1, wherein:
the first color plane includes an R plane constituted of a plurality of pixels having tone values of a color R;
the second color plane includes a G plane constituted of a plurality of pixels having tone values of a color G;
the third color plane includes a B plane constituted of a plurality of pixels having tone values of a color B; and
the variable includes a first variable indicating the identicalness of the images in the image regions that correspond between the R plane, the G plane, and the B plane.

4. The image data processing method according to claim 3, wherein:
the first color plane includes a C plane constituted of a plurality of pixels having tone values of a color C;
the second color plane includes an M plane constituted of a plurality of pixels having tone values of a color M;
the third color plane includes a Y plane constituted of a plurality of pixels having tone values of a color Y;
the variable includes a second variable indicating the identicalness of the images in the image regions that correspond between the C plane, the M plane, and the Y plane; and
the image data processing method further comprises converting the R plane, the G plane, the B plane, and the first variable into the C plane, the M plane, and the Y plane, and the second variable.

5. The image data processing method according to claim 4, wherein:
the first color plane includes a C dot plane constituted of dot data indicating a forming state of dots formed of a color material of the color C;
the second color plane includes an M dot plane constituted of dot data indicating a forming state of dots formed of a color material of the color M;
the third color plane includes a Y dot plane constituted of dot data indicating a forming state of dots formed of a color material of the color Y;
the variable includes a third variable indicating the identicalness of the images in the image regions that correspond between the C plane, the M plane, and the Y plane; and
the image data processing method further comprises converting the C plane, the M plane, the Y plane, and the first variable into the C dot plane, the M dot plane, the Y dot plane, and the third variable.

6. An image data processing apparatus for printing or displaying print data, via an associated image forming unit, described in a page description language (PDL), the image data processing apparatus comprising:
a control unit having a processor; and
a storage unit having a working memory and storing a control-unit process control program containing instructions stored in the working memory whose execution by the processor configures the control unit as a PDL processing unit, a rendering processing unit, and a color conversion processing unit, and causes the image data processing apparatus to execute steps including
analyzing, in the PDL processing unit, the print data to extract objects included in the print data,
generating bitmap-image pixel data in the rendering processing unit using the objects, based on rendering information contained in the print data, the bitmap-image pixel data including respective pluralities of pixels constituting first, second, and third primary-color planes,
executing a plane buffer allocating process in the rendering processing unit of allocating in a band buffer in the working memory a band buffer region having a memory size substantially for at least one of the first, second, and third primary-color planes,
dividing each of the first, second, and third primary-color planes into a plurality of bands constituted by mutually corresponding identical image regions,
generating, in the color conversion processing unit, image-reproduction data in each of the first, second, and third primary-color planes for reproducing the print-data objects, and generating for each of the first, second, and third primary-color planes an identical image flag as a variable indicating identicalness of the bands,
analyzing, in the rendering processing unit, the variables to determine identicalness of the bands,
executing, in the rendering processing unit, a plane compatibility determination process of determining based on the determined identicalness of the bands whether respective planes sharing a band buffer region have compatibility for sharing, so as to generate image rendering data representing an image constituted of the first, second, and third primary-color planes, according to which for any two planes having shared images, color-rendering of an object is carried out for only one plane, and printing or displaying the image rendering data with the image forming unit.

7. The image data processing apparatus according to claim 6, wherein the analyzing includes executing a determination whether an object extracted from the print data instructs a reproduction of a specified image that is reproduced by any one of the three primary colors or an equal color mixture of the three primary colors or not, and generating the variable upon determining that the object instructs the reproduction of the specified image.

8. The image data processing apparatus according to claim 6, wherein:

the first color plane includes an R plane constituted of a plurality of pixels having tone values of a color R;

the second color plane includes a G plane constituted of a plurality of pixels having tone values of a color G;

the third color plane includes a B plane constituted of a plurality of pixels having tone values of a color B; and the variable includes a first variable indicating the identicalness of the images in the image regions that correspond between the R plane, the G plane, and the B plane.

9. The image data processing apparatus according to claim 8, wherein:

the first color plane includes a C plane constituted of a plurality of pixels having tone values of a color C;

the second color plane includes an M plane constituted of a plurality of pixels having tone values of a color M;

the third color plane includes a Y plane constituted of a plurality of pixels having tone values of a color Y;

the variable includes a second variable indicating the identicalness of the images in the image regions that correspond between the C plane, the M plane, and the Y plane; and the image data processing unit converts the R plane, the G plane, the B plane, and the first variable into the C plane, the M plane, and the Y plane, and the second variable.

10. The image data processing apparatus according to claim 9, wherein:

the first color plane includes a C dot plane constituted of dot data indicating a forming state of dots formed of a color material of the color C;

the second color plane includes an M dot plane constituted of dot data indicating a forming state of dots formed of a color material of the color M;

the third color plane includes a Y dot plane constituted of dot data indicating a forming state of dots formed of a color material of the color Y;

the variable includes a third variable indicating the identicalness of the images in the image regions that correspond between the C plane, the M plane, and the Y plane; and the image data processing unit converts the C plane, the M plane, the Y plane, and the first variable into the C dot plane, the M dot plane, the Y dot plane, and the third variable.

11. A non-transitory computer-readable recording medium storing a control program for controlling an image data processing apparatus for printing or displaying print data, via an associated image forming unit, described in a page description language (PDL), the image data processing apparatus including a control unit having a processor and a storage unit having a working memory, the control program including program instructions whose execution by the control-unit processor causes the image data processing apparatus to execute steps including:

analyzing, in the PDL processing unit, the print data to extract objects included in the print data;

generating bitmap-image pixel data in the rendering processing unit using the objects, based on rendering information contained in the print data, the bitmap-image pixel data including respective pluralities of pixels constituting first, second, and third primary-color planes;

executing a plane buffer allocating process in the rendering processing unit of allocating in a band buffer in the working memory a band buffer region having a memory size substantially for at least one of the first, second, and third primary-color planes;

dividing each of the first, second, and third primary-color planes into a plurality of bands constituted by mutually corresponding identical image regions;

generating, in the color conversion processing unit, image-reproduction data in each of the first, second, and third primary-color planes for reproducing the print-data objects, and generating for each of the first, second, and third primary-color planes an identical image flag as a variable indicating identicalness of the bands;

analyzing, in the rendering processing unit, the variables to determine identicalness of the bands;

executing, in the rendering processing unit, a plane compatibility determination process of determining based on the determined identicalness of the bands whether respective planes sharing a band buffer region have compatibility for sharing, so as to generate image rendering data representing an image constituted of the first, second, and third primary-color planes, according to which for any two planes having shared images, color-rendering of an object is carried out for only one plane; and printing or displaying the image rendering data with the image forming unit.

12. The recording medium according to claim 11, wherein the analyzing includes executing a determination whether an object extracted from the print data instructs a reproduction of a specified image that is reproduced by any one of the three primary colors or an equal color mixture of the three primary colors or not, and generating the variable upon determining that the object instructs the reproduction of the specified image.

13. The recording medium according to claim 11, wherein:

the first color plane includes an R plane constituted of a plurality of pixels having tone values of a color R;

the second color plane includes a G plane constituted of a plurality of pixels having tone values of a color G;

the third color plane includes a B plane constituted of a plurality of pixels having tone values of a color B; and the variable includes a first variable indicating the identicalness of the images in the image regions that correspond between the R plane, the G plane, and the B plane.

14. The recording medium according to claim 13, wherein:

the first color plane includes a C plane constituted of a plurality of pixels having tone values of a color C;

the second color plane includes an M plane constituted of a plurality of pixels having tone values of a color M;

the third color plane includes a Y plane constituted of a plurality of pixels having tone values of a color Y;

the variable includes a second variable indicating the identicalness of the images in the image regions that correspond between the C plane, the M plane, and the Y plane; and the image data processing unit converts the R plane, the G plane, the B plane, and the first variable into the C plane, the M plane, and the Y plane, and the second variable.

15. The recording medium according to claim 14, wherein:

the first color plane includes a C dot plane constituted of dot data indicating a forming state of dots formed of a color material of the color C;

the second color plane includes an M dot plane constituted of dot data indicating a forming state of dots formed of a color material of the color M;

the third color plane includes a Y dot plane constituted of dot data indicating a forming state of dots formed of a color material of the color Y;

the variable includes a third variable indicating the identicalness of the images in the image regions that correspond between the C plane, the M plane, and the Y plane; and the image data processing unit converts the C plane, the M plane, the Y plane, and the first variable into the C dot plane, the M dot plane, the Y dot plane, and the third variable.

* * * * *